F. F. METZGER.
CRANE FOR PHONOGRAPH HORNS OR SOUND AMPLIFIERS.
APPLICATION FILED DEC. 17, 1909.

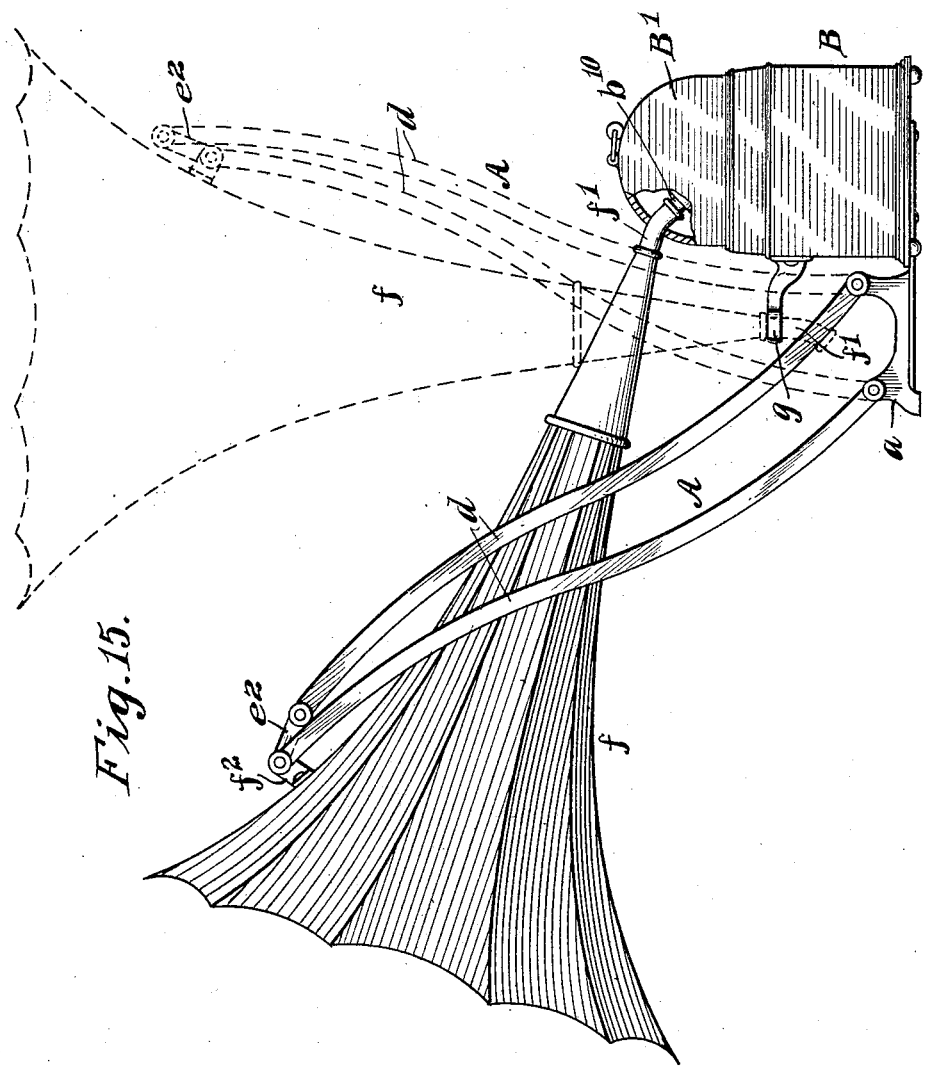

998,917.

Patented July 25, 1911.

6 SHEETS—SHEET 1.

WITNESSES:
Thomas M. Smith
G. M. Connerton

INVENTOR.
Ferdinand F. Metzger
BY
J. Walter Douglas
ATTORNEY.

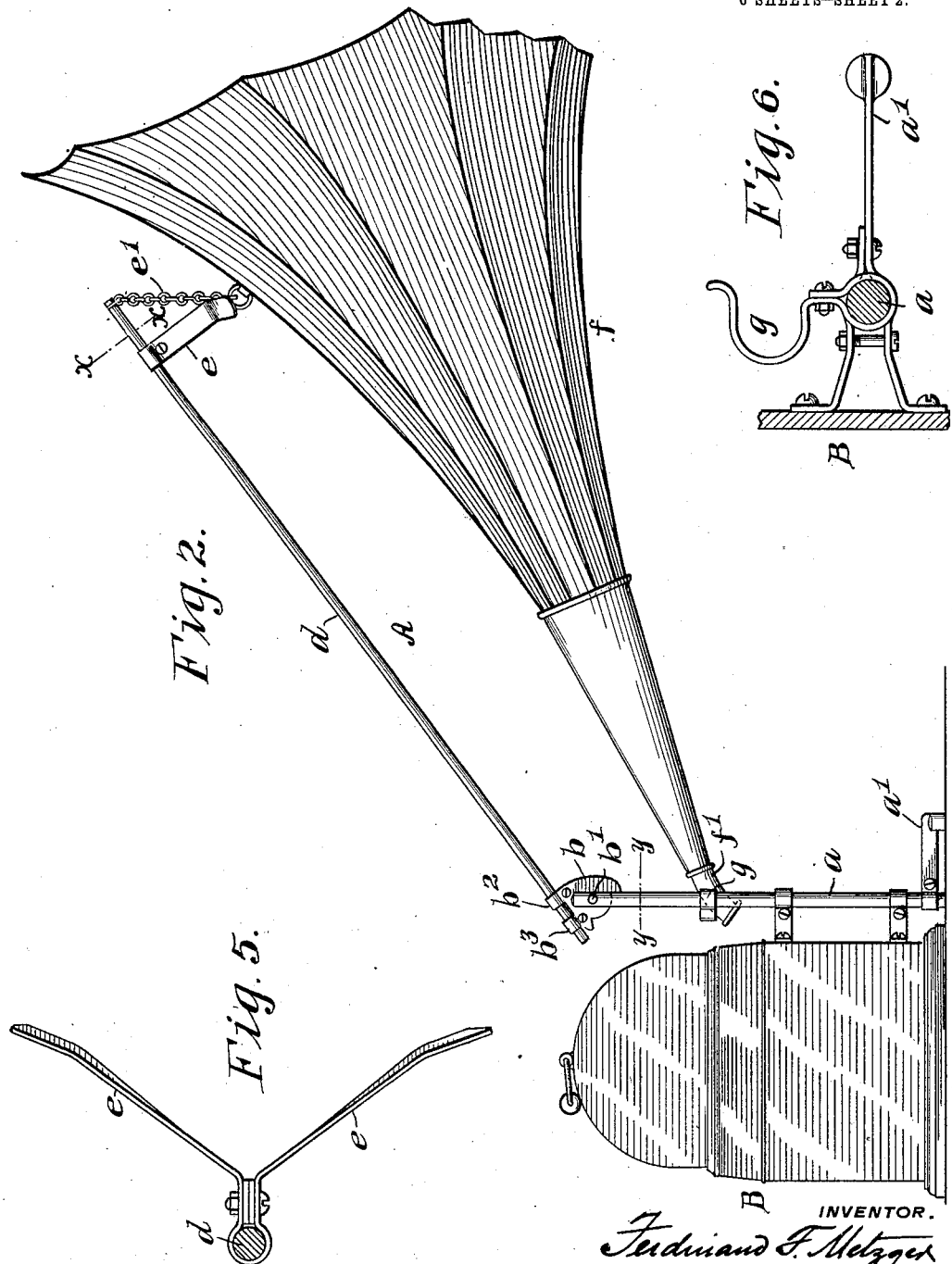

F. F. METZGER.
CRANE FOR PHONOGRAPH HORNS OR SOUND AMPLIFIERS.
APPLICATION FILED DEC. 17, 1909.
998,917.
Patented July 25, 1911.
6 SHEETS—SHEET 3.
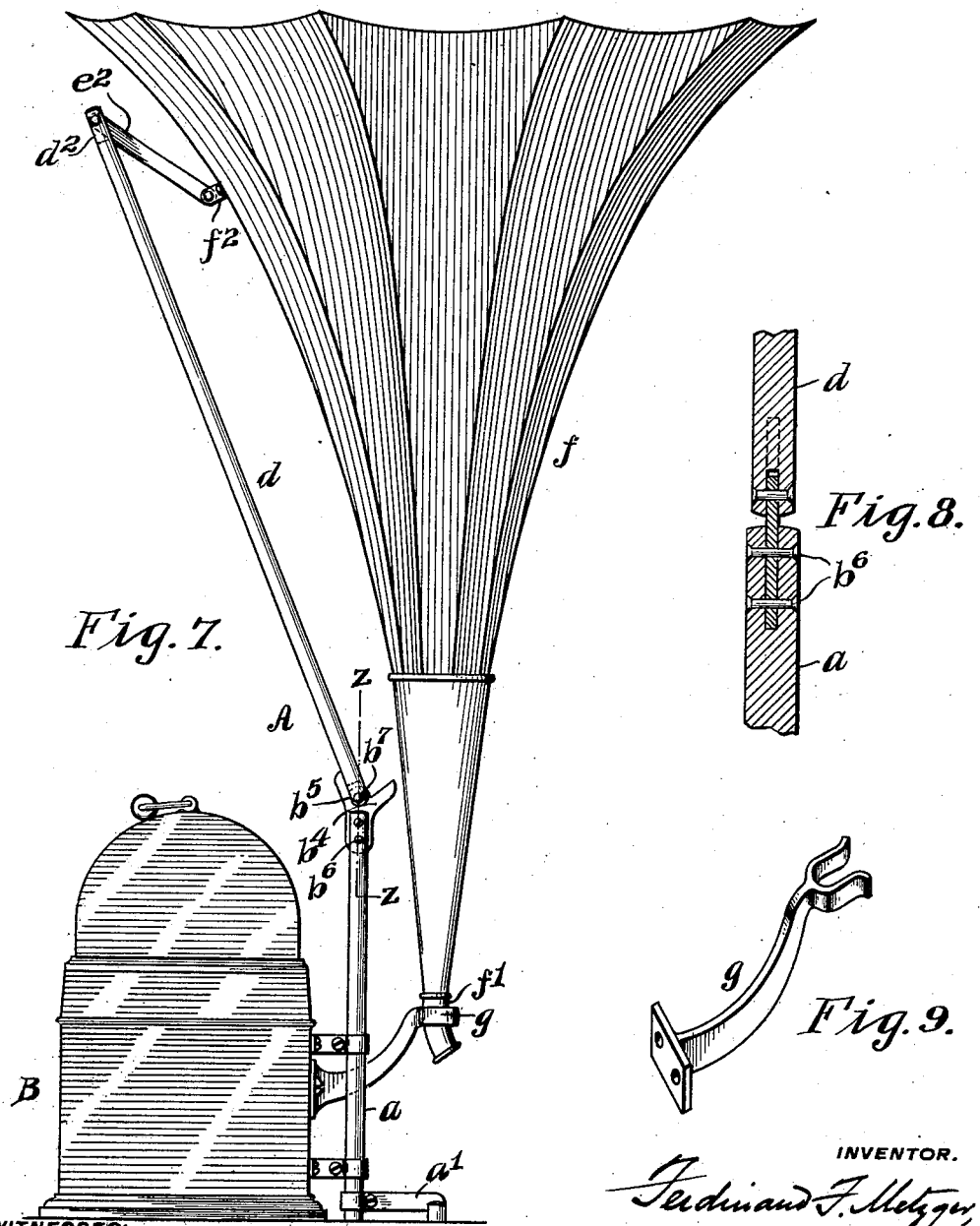

F. F. METZGER.
CRANE FOR PHONOGRAPH HORNS OR SOUND AMPLIFIERS.
APPLICATION FILED DEC. 17, 1909.
998,917.
Patented July 25, 1911.
6 SHEETS—SHEET 4.
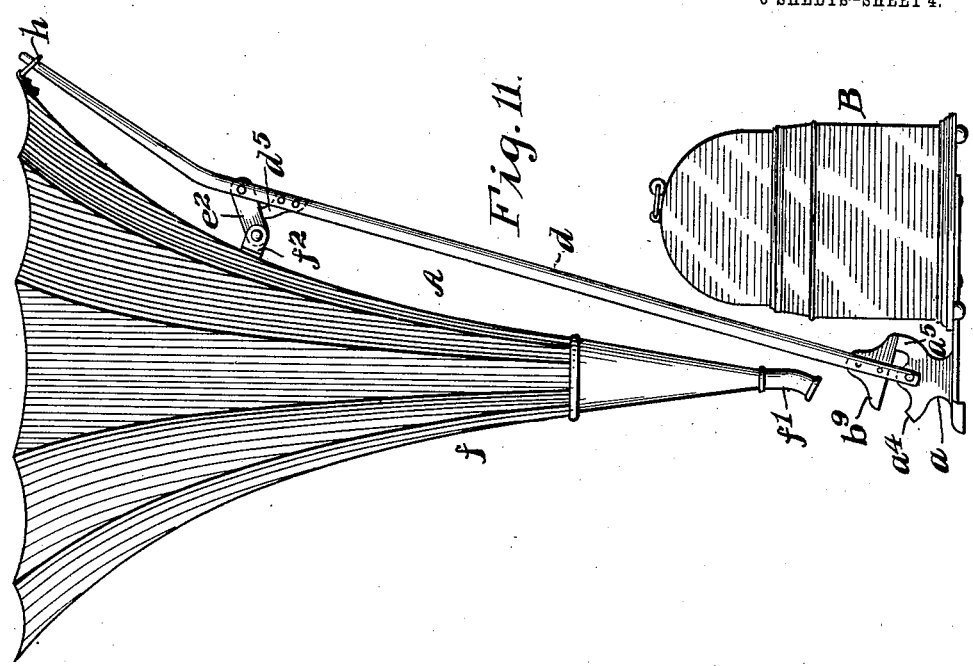
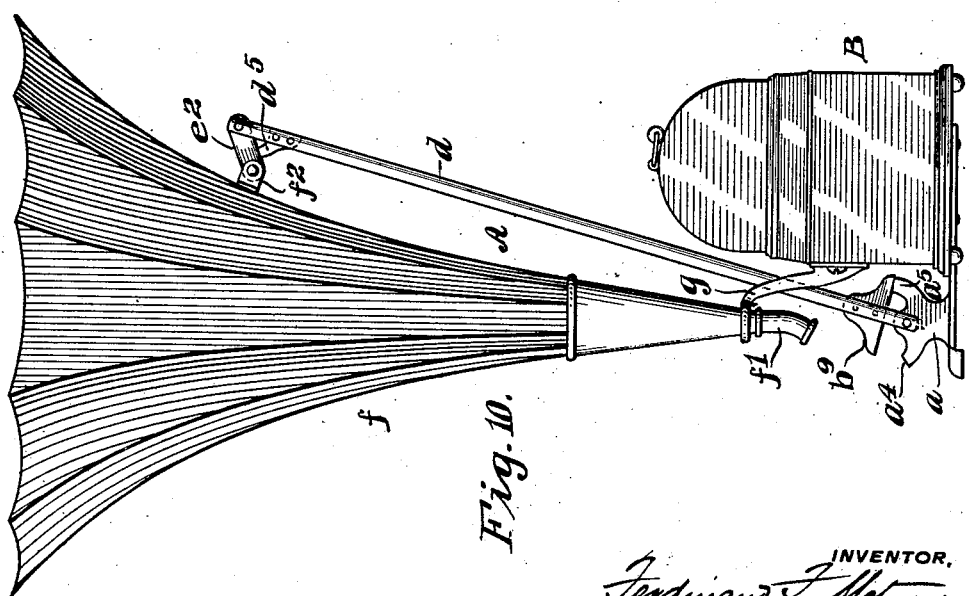

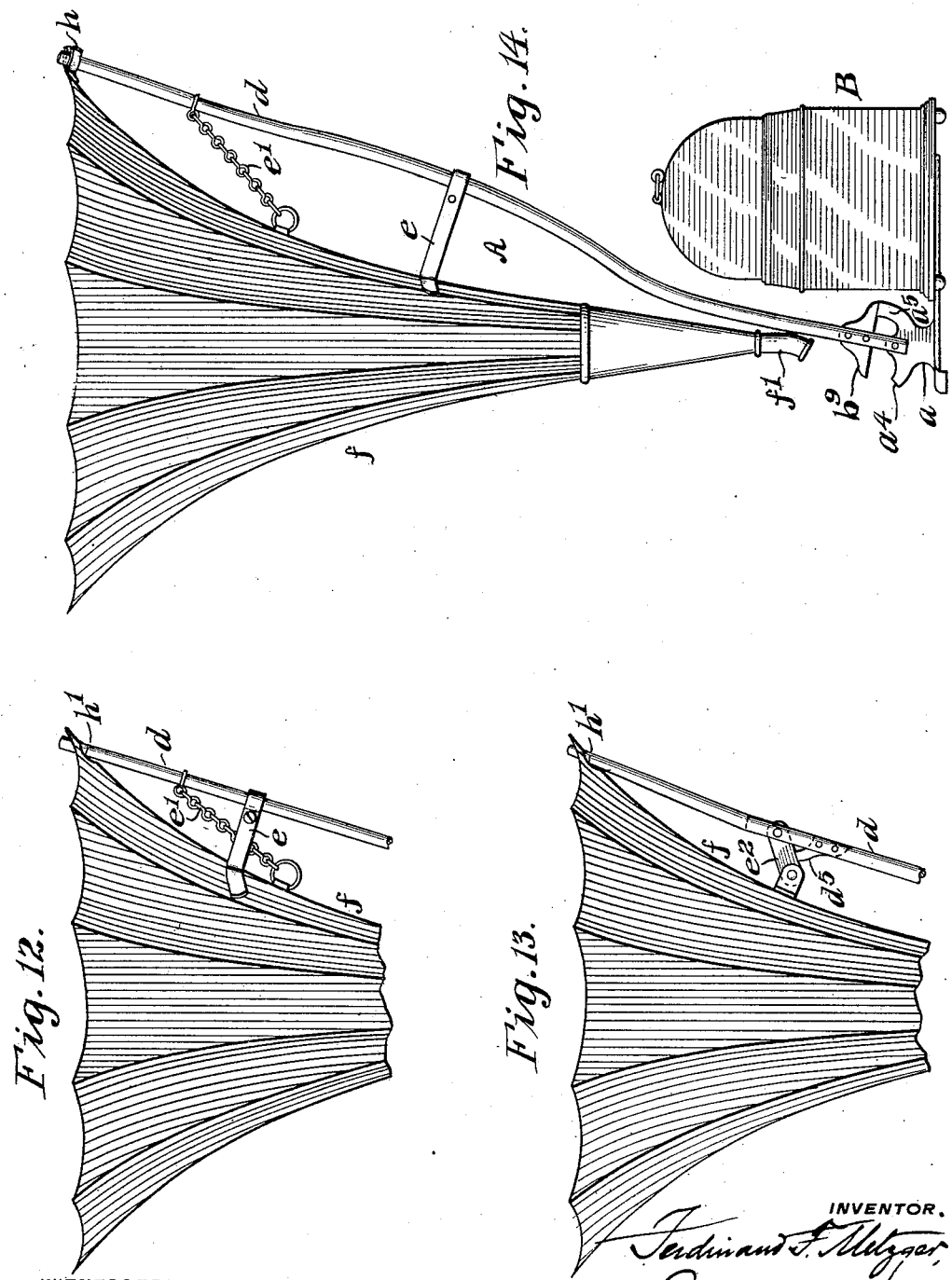

UNITED STATES PATENT OFFICE.

FERDINAND F. METZGER, OF PHILADELPHIA, PENNSYLVANIA.

CRANE FOR PHONOGRAPH-HORNS OR SOUND-AMPLIFIERS.

998,917. Specification of Letters Patent. Patented July 25, 1911.

Application filed December 17, 1909. Serial No. 533,678.

*To all whom it may concern:*

Be it known that I, FERDINAND F. METZGER, a citizen of the United States, residing at the city of Philadelphia, in the county of Philadelphia and State of Pennsylvania, have invented certain new and useful Improvements in Cranes for Phonograph-Horns or Sound-Amplifiers, of which the following is a specification.

My invention has relation to means for carrying an article, the horn of a sound reproducing machine for instance arranged so that when the article is shifted from an operative into a predetermined inoperative position, it will be there maintained until removed from such position; and in such connection my invention relates to the constructive arrangement of said means for the defined purpose, among other uses, thereof.

Broadly considered, my invention consists of a support or crane arranged to be vertically movable on a pivot and which is furnished with stops for limiting its movement in either direction, the stop for limiting the upward movement being operative only when the support is in an elevated position in order that it, and an article carried thereby, will be maintained in such position, until removed therefrom.

My invention is intended primarily for use, in connection with the amplifier of a sound recording and reproducing machine, the support or crane carrying the horn practically horizontal when in operative relation to the machine and being adapted to support it in an elevated or practically vertical position when not in use.

My invention, while comparatively simple in principle may be carried out in a great variety of ways; and this will be more fully understood from the following description taken in connection with the accompanying drawings, in which—

Figure 1:
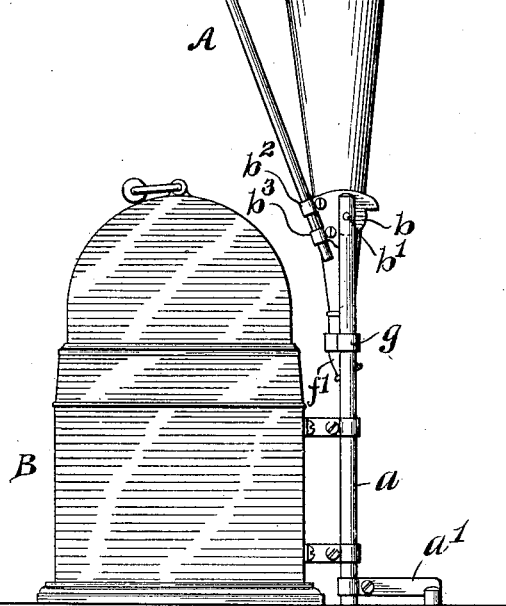
Figure 3:
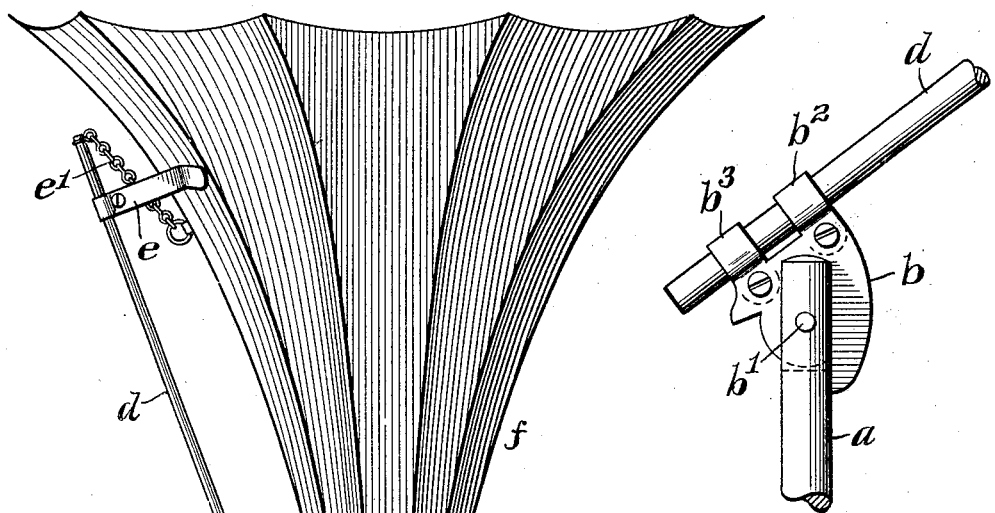
Figure 4:
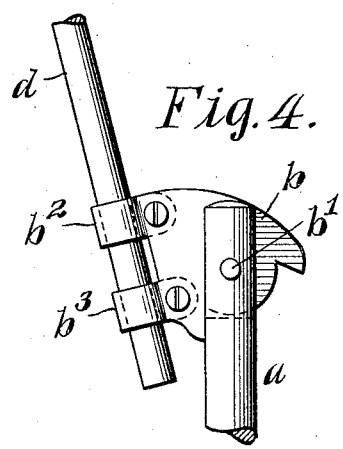

Figure 1, is a side elevational view, showing the crane supporting a horn in an inoperative position embodying as operatively arranged main features in one form of my invention. Fig. 2, is a side elevational view of a movable crane for a phonograph horn shown in suspended position therefrom. Figs. 3 and 4, are respectively side elevational views of the different positions of the movable connection between the standard and the rod thereof, when the horn is respectively, in Fig. 3, with the horn in the inoperative position of Fig. 1 and in Fig. 4, with the horn in the operative position of Fig. 2. Fig. 5, is a cross-sectional view on the line $x$, $x$, of Fig. 2, of the bracket for engaging the horn. Fig. 6, is a cross-sectional view on the line $y$, $y$, of Fig. 2, of the U-shaped rest for the horn tube, but shown removed, this view also showing the standard and clips for engaging the same to the phonograph-box. Fig. 7, is a side elevational view of another type of crane for supporting a phonograph horn, showing the horn in a vertical inoperative position with respect to the phonograph, the crane in this instance being arranged with a standard and rod in pivotal connection and with limiting stops as a part of the connection and a U-shaped rest for engaging the horn-tube therein. Fig. 8, is a vertical central section of the pivotal connection for the standard and rod on the line $z$, $z$, of Fig. 7. Fig. 9, is a perspective view of the U-shaped rest of Fig. 7. Fig. 10, is a side elevational view of another form of the crane linked to a rod of the standard, the rod being provided with limiting front and back stops for the link and rod and a ring-shaped rest for the horn tube. Fig. 11, is a similar view of still another form of crane with limiting stops for the horn link and an eye for engaging the rod extending from the mouth of the horn. Figs. 12 and 13, are respectively two side elevational views in broken section, of horns and cranes therefor, showing still further connected arrangements with the horn. Fig. 14, is a side-elevational view of an inoperative vertical position of the horn suspended from the crane, in this instance embodying a further modification of a horn engaging bracket, a chain connection with the horn and the latter having an opening for engaging the rod provided with front and back stops to engage the standard; and Fig. 15, is a side elevational view of a still further modification of the crane for a phonograph horn having a standard with arms in pivotal connection with the standard and horn and showing the horn in full lines in operative position and in dotted outline in an inoperative position, and also a link pivoted to both arms and with a U-shaped rest for engaging the smaller end of the horn.

Referring to the drawings, with reference to Figs. 1 to 6 inclusive, A is the crane, consisting of a standard $a$, having a foot $a^1$, to support firmly the standard and removably clipped to the box B, of the phonograph. A double stop connection $b$, is pivoted at $b^1$, to the standard and by bearings $b^2$ and $b^3$, engages a rod $d$. Near the upper extremity is arranged a bracket $e$, to engage the bell of a horn $f$. The horn $f$, is detachably connected to the rod $d$, by means of a flexible connection, as a chain $e^1$, Figs. 1 and 2. To one side of the standard $a$, is arranged a U-shaped rest $g$, to engage the lower end $f^1$, of the horn $f$, when the tube has been removed from the mouth-piece of the phonograph concealed in the box B, so that when the crane is manually manipulated in a backward direction, the tube $f^1$, of the horn $f$, may enter the rest $g$, and the bracket $e$, contact with the upper portion of the horn to hold the same in whatever shifted inoperative position may be given it, for example, such as is indicated in Fig. 1. In such manner, the horn, as required, may be quickly returned to an operative relation in respect to the phonograph for being employed to amplify sound waves issuing therethrough when the instrument is in action.

In Figs. 7 and 8, the crane A, is provided with a standard $a$, having a foot $a^1$. Between the rod $d$, and standard $a$, is interposed a device having front and back stops $b^4$ and $b^5$. This device is riveted at $b^6$, to the standard $a$, and the rod $d$, is pivoted at $b^7$, to the same. The rest $g$, in this instance is secured to the phonograph-box B, and projects therefrom, so that the horn tube $f^1$, when the horn $f$, is shifted into a vertical relation with respect to the said box, will rest therein. The rod $d$, is in flexible connection with the horn $f$, by means of a link $e^2$, as clearly shown in Fig. 7. This link $e^2$, occupies such a position in the slit $d^2$, at the upper end of the rod $d$, as that when the horn is in an inoperative vertical position as shown in Fig. 7, the link will occupy an inclining position from the horn support $f^2$.

In Figs. 10 and 11, the crane A, consists of a standard $a$, having front and back stops $a^4$ and $a^5$. The rod $d$, is pivoted to the standard and carries preferably riveted thereto a double stop $b^9$, adapted to seat upon either of the stops $a^4$ and $a^5$, of the standard $a$, according to the particular position of the rod carrying the horn $f$, linked at $e^2$, thereto. The rod $d$, beneath the flexible link connection of the horn, is provided with a stop $d^5$, to limit the vertical or inclining positions of the horn $f$, in its suspended relation therefrom. The horn-tube $f^1$, in this view, rests in the inoperative position of the horn $f$, in the ring-shaped rest $g$, shown projecting from the phonograph box B, but this rest may be arranged, as will be understood, so as to extend upward from the standard $a$, with similar results.

In Fig. 11, the arrangement of the crane A, is the same as in Fig. 10, save that the rest $g$, for the horn-tube $f^1$, is dispensed with, and at the upper end the horn $f$, is provided with an eye $h$, for the rod $d$, to engage and to serve the same purpose as the rest $g$, of Fig. 10, when the horn $f$, is held suspended from the crane A, by any of the many arrangements of the flexible connections for the horn $f$ and rod $d$, as hereinbefore fully explained.

In Fig. 12, the crane A, with respect to its flexible connection with the horn $f$ and rod $d$, consists of a chain $e^1$, and a bracket $e$. The rest $g$, may be dispensed with in this instance and the same function performed by the end of the rod $d$, being passed through an eye $h^1$, arranged in the mouth of the horn $f$.

In Fig. 13, the flexible connection is a link $e^2$, with a back-stop $d^5$, projecting from the rod $d$. When the link $e^2$, is used, it is to be understood that it must be loose enough to allow a free movement of the small end of the horn when connected to the recorder or reproducer. The horn $f$, has an eye $h^1$, formed in the mouth of the same through which the upper end of the rod passes, as in Fig. 12.

In Fig. 14, the crane A, as to the standard $a$, and rod $d$, with its attachments, are the same as shown in Fig. 11, except that the flexible connection of the horn $f$, with the rod $d$, is a chain $e^1$, but in this instance the bracket $e$, is employed, as in Figs. 1 and 2, but the location on the rod $d$, for engagement with the horn $f$, in the inoperative position of the horn is nearer the lower end of the rod, the chain connection $e^1$, being as shown in former figures. Moreover, in this view, the U-shaped rest $g$, is dispensed with and a U-shaped device $h$, is substituted for the eye $h$, of Fig. 11, and is arranged to extend from the horn mouth so as to permit the upper end of the rod $d$, to engage therewith and thus to serve the same purpose as the rest $g$, for the horn-tube $f^1$, of Figs. 1 and 2, when the horn is shifted into its inoperative vertical or inclining position.

In Fig. 15, the crane A, consists of a standard $a$, having two rods $d, d$, pivoted thereto, which at their upper ends are by a link $e^2$, connected with each other and with a support $f^2$, of the horn $f$, so as to establish a flexible connection of the rods $d, d$, with the standard $a$ and horn $f$. The phonograph-box B, has projecting therefrom a U-shaped rest $g$, for the horn-tube $f^1$. In this view, is shown, by the broken section of the phonograph-box B, the mouth-piece $b^{10}$. The horn $f$, is shifted into a vertical inoperative position as indicated in dotted outline, when the end of the tube $f^1$, is disengaged from the mouth-piece $b^{10}$, so as to engage the rest $g$, of the box B. The operative position of the horn $f$, is shown in this view in full lines, in connection with the mouth-piece $b^{10}$, of the phonograph.

In the accompanying drawings and specification as above, I have shown and described therein various arrangements of means for carrying a horn or other object and for limiting the movement of the rod $d$, but, however, it should be understood, that many other arrangements of said means for accomplishing the same purpose may be substituted and equally good results be obtained, therefore, I do not wish to be understood as limiting myself to the different arrangements hereinbefore described and illustrated, but

Having thus described the nature and objects of my invention, what I claim as new and desire to secure by Letters Patent is:—

1. Means for supporting the horn of a sound-reproducing machine, comprising a standard, an arm movably connected to the standard, and a rest, the arrangement of the latter being such that when the horn is shifted to inoperative position, with respect to the machine, it is held by the rest, substantially as described.

2. Means for supporting the horn of a sound-reproducing machine, comprising a standard, an arm movably connected to the standard and a rest connected with the arm, the arrangement of the latter being such that when the horn is shifted to inoperative position, with respect to the machine, it engages with and is held by the rest, substantially as described.

3. Means for supporting the horn of a sound-reproducing machine, comprising a standard, a supporting arm connected with said standard and arranged to permit of a predetermined limited movement thereof, a link connecting the horn with said supporting arm and a rest, the arrangement being such that when the horn is shifted into inoperative position with respect to the machine, it engages with and is held by the rest, substantially as described.

4. Means for supporting the horn of a sound-reproducing machine, comprising a standard, a supporting arm, connected with the standard and arranged to permit of a predetermined movement thereof, a link connecting the horn with the arm, two stops, one to hold said arm in one position and the other to hold the same in the other position and a rest, the arrangement being such that when the horn is shifted into inoperative position with respect to the machine, it engages with and is held by the rest, substantially as described.

In witness whereof, I have hereunto set my signature in the presence of two subscribing witnesses.

FERDINAND F. METZGER.

Witnesses:
   J. WALTER DOUGLASS,
   THOMAS M. SMITH.

---

Copies of this patent may be obtained for five cents each, by addressing the "Commissioner of Patents, Washington, D. C."